(12) United States Patent
Xu et al.

(10) Patent No.: US 12,188,556 B2
(45) Date of Patent: Jan. 7, 2025

(54) BLOCKING COMPONENT AND SHIFT MECHANISM

(71) Applicant: FICOSA INTERNATIONAL TAICANG CO. LTD, Jiangsu Province (CN)

(72) Inventors: Kan Xu, Shanghai (CN); Feng Zhang, Suzhou (CN); Cheng Huang, Taicang (CN)

(73) Assignee: FICOSA INTERNATIONAL TAICANG CO. LTD, Jiangsu Province (CN)

( * ) Notice: Subject to any disclaimer, the term of this patent is extended or adjusted under 35 U.S.C. 154(b) by 81 days.

(21) Appl. No.: 17/927,572

(22) PCT Filed: Sep. 30, 2020

(86) PCT No.: PCT/CN2020/119280
§ 371 (c)(1),
(2) Date: Nov. 23, 2022

(87) PCT Pub. No.: WO2021/238005
PCT Pub. Date: Dec. 2, 2021

(65) Prior Publication Data
US 2023/0204101 A1 Jun. 29, 2023

(30) Foreign Application Priority Data
May 27, 2020 (CN) .......................... 202010461863.4

(51) Int. Cl.
*F16H 61/18* (2006.01)
*F16H 59/10* (2006.01)

(52) U.S. Cl.
CPC ............. *F16H 61/18* (2013.01); *F16H 59/10* (2013.01)

(58) Field of Classification Search
CPC .......... F16H 59/02; F16H 59/08; F16H 61/18; F16H 1/24; F16H 63/42
(Continued)

(56) References Cited

U.S. PATENT DOCUMENTS 3,566,703 A * 3/1971 Van Noord ............ B62D 1/181
292/201
5,401,067 A * 3/1995 Kurosaki .................. E05C 5/00
292/DIG. 4
(Continued)

FOREIGN PATENT DOCUMENTS

| CN | 204099568 U | 1/2015 |
| CN | 206361134 U | 7/2017 |
| CN | 111637218 A | 9/2020 |

OTHER PUBLICATIONS

International Search Report and Written Opinion for International Application No. PCT/CN2020/119280; International Filing Date Sep. 30, 2020; Report Mail Date Feb. 12, 2021 (pp. 1-11).

*Primary Examiner* — T. Scott Fix
(74) *Attorney, Agent, or Firm* — CANTOR COLBURN LLP

(57) ABSTRACT

A blocking component includes a body, arranged fixedly, a slidable member, slidably connected to the body and movable relative to the body, an elastic member, arranged between the body and the slidable member and configured to apply an elastic reset force to the slidable member so that the slidable member tends to move towards the outside of the body and a blocking member, rotatably connected to the slidable member and having a stop surface facing away from the body, a transition surface facing the body, and an abutting surface facing the slidable member. When the blocking member is in a natural state, the abutting surface is in contact with a surface of the slidable member, and the
(Continued)

natural state includes at least a state in which no external force away from the body is applied to the transition surface.

9 Claims, 13 Drawing Sheets

(58) Field of Classification Search
USPC .......... 292/66, 63, 71, 61, 60, 58, 57; 74/49, 74/50, 473.21
See application file for complete search history.

(56) References Cited

U.S. PATENT DOCUMENTS

| | | | |
|---|---|---|---|
| 7,533,911 B2* | 5/2009 | Homner | ................ E05B 51/023 |
| | | | 244/129.4 |
| 8,191,937 B2* | 6/2012 | Lin | ........................... E05C 7/06 |
| | | | 292/89 |
| 11,773,619 B2* | 10/2023 | Weber | ................. E05B 17/0029 |
| | | | 292/144 |
| 2007/0081855 A1* | 4/2007 | Chou | ....................... B25G 3/18 |
| | | | 403/322.4 |
| 2015/0323064 A1 | 11/2015 | Yamamura et al. | |
| 2015/0362067 A1 | 12/2015 | Mitteer et al. | |
| 2017/0114892 A1 | 4/2017 | Abe | |
| 2018/0087778 A1* | 3/2018 | Ivanovic | ............... E05B 47/023 |
| 2020/0072346 A1 | 3/2020 | Matsumoto et al. | |

\* cited by examiner

BLOCKING COMPONENT AND SHIFT MECHANISM

CROSS-REFERENCE TO RELATED APPLICATIONS

This application claims priority to Chinese Patent Application No. 202010461863.4, entitled "BLOCKING COMPONENT AND SHIFT MECHANISM" and filed on May 27, 2020, which is incorporated by reference in its entirety.

BACKGROUND

Technical Field

The present invention relates to the technical field of shift mechanisms, and in particular, to a blocking component and a shift mechanism using or configured with the blocking component.

Related Art

The description in this section merely provides background related to the present disclosure and does not constitute the prior art.

The known shift mechanism can realize the shift of gears among P, R, N, D, and L/M. Based on the gear arrangement or design sequence of a relatively mature in-line shift mechanism at present, a P gear, an R gear, an N gear, a D gear, and an L/M gear are arranged in sequence from top to bottom. The D gear is a gear which is used relatively frequently, while the L/M gear is used less frequently. In this way, during shifting from the P gear, the R gear, or the N gear to the D gear, a problem of shifting to a wrong gear (for example, shifting to an L/M gear) easily occurs.

It should be noted that the above description of the technical background is made only for the convenience of clear and complete explanation of the technical solutions of the present invention and the understanding of those skilled in the art. The description of these solutions in the Background should not be construed to imply that these solutions are known to a person skilled in the art.

SUMMARY

A blocking component, in accordance with a non-limiting example, includes a body, arranged fixedly, a slidable member, slidably connected to the body and movable relative to the body, an elastic member, arranged between the body and the slidable member and configured to apply an elastic reset force to the slidable member so that the slidable member tends to move towards the outside of the body and a blocking member, rotatably connected to the slidable member and having a stop surface facing away from the body, a transition surface facing the body, and an abutting surface facing the slidable member. When the blocking member is in a natural state, the abutting surface is in contact with a surface of the slidable member, and the natural state includes at least a state in which no external force away from the body is applied to the transition surface.

In addition to one or more of the features described herein the blocking member is bent and comprises a blocking section and a stop section connected to the blocking section, the stop surface and the transition surface are two opposite surfaces of the stop section, and the abutting surface is a bottom surface of the stop section, and a rotational connection point between the blocking member and the slidable member is substantially located at a joint between the blocking section and the stop section, and a torque between a center of mass of the stop section and the rotational connection point is greater than a torque between a center of mass of the blocking section and the rotational connection point.

In addition to one or more of the features described herein a torsion spring is arranged at the rotational connection point, and when the blocking component is in the natural state, a torsion applied to the blocking member by the torsion spring is 0 or slightly greater than 0.

In addition to one or more of the features described herein the body is provided with an accommodating cavity having an open end, the slidable member is partially accommodated in the accommodating cavity and movable in the accommodating cavity, and the elastic member is biased between an inner wall of the accommodating cavity and the slidable member.

In addition to one or more of the features described herein an outer side wall of the body at the open end of the accommodating cavity extends outwards to form a sliding rail, an end of the slidable member extends outwards to form an extension, the slidable member is configured to slide on the sliding rail, a connecting portion is arranged on the extension, the blocking member is rotatably arranged on the connecting portion, and the abutting surface faces a surface of the extension.

In addition to one or more of the features described herein an end of the slidable member located in the accommodating cavity is recessed inward to form a groove, a first positioning protrusion is formed on a bottom wall of the groove, a second positioning protrusion corresponding to the first positioning protrusion is formed on a bottom wall of the accommodating cavity, and the elastic member extends through the groove and has two ends respectively sleeved outside the first positioning protrusion and the second positioning protrusion.

In addition to one or more of the features described herein a limiting groove extending in a same direction as a moving direction of the slidable member is arranged on a side wall of the body, a limiting member is arranged on an outer wall of the slidable member, and the limiting member movably extends through the limiting groove.

A shift mechanism, in accordance with a non-limiting example, includes a housing and gear slots, formed on the housing. The gear slots include a plurality of first gear slots, one second gear slot, and one third gear slot arranged in sequence. A shift lever assembly is rotatably connected to the housing. A shift limit pin is linked with the shift lever assembly for shifting among the gear slots. A blocking component includes a body is fixedly arranged on the housing. The blocking component includes a stop surface and a transition surface located on a motion path of the shift limit pin. A slidable member has a compressed state in which the slidable member moves towards an inner side of the body to a dead point position, and a reset state in which the slidable member moves towards an outer side of the body to a dead point position. When the shift limit pin moves from any of the first gear slots towards the second gear slot until the shift limit pin is in contact with the stop surface and pushes the slidable member to move to the compressed state, the shift limit pin corresponds to the second gear slot and is staggered with the third gear slot, and when the shift limit pin enters the second gear slot, the slidable member is switched to the reset state through the elastic member.

In addition to one or more of the features described herein when the shift limit pin moves from the second gear slot or the third gear slot towards any of the first gear slots until the shift limit pin is in contact with and abuts against the transition surface, the blocking member rotates, and when the shift limit pin is separated from the transition surface, and the blocking member is reset to the natural state.

In addition to one or more of the features described herein a torsion spring is arranged at a rotational connection point between the blocking member and the slidable member, and the torsion spring is configured to apply a torsion to the blocking member to overcome shaking of the blocking member caused by an external force.

BRIEF DESCRIPTION OF THE DRAWINGS

The drawings described herein are only for explanatory purposes and do not intend to limit the scope disclosed in the present invention in any manner. In addition, shapes, and proportions of components in the figures are only schematic and are used to help the understanding of the present invention, and do not specifically limit the shapes and proportions of the components of the present invention. Under the teachings of the present invention, a person skilled in the art can select various possible shapes and proportions according to specific conditions to implement the present invention. In the accompanying drawings.

DETAILED DESCRIPTION

To make a person skilled in the art understand the technical solutions in the present invention better, the following clearly and completely describes the technical solutions in the embodiments of the present invention with reference to the accompanying drawings in the embodiments of the present invention. Apparently, the described embodiments are only some embodiments rather than all the embodiments of the present invention. All other embodiments obtained by a person of ordinary skill in the art based on the embodiments of the present invention without creative efforts shall fall within the protection scope of the present invention.

It should be noted that, when a component is referred to as "being arranged on" another component, the component may be directly on the another component, or there may be an intermediate component. When one component is considered as "being connected to" another component, the component may be directly connected to the another component, or an intermediate component may simultaneously exist. The terms "vertical", "horizontal", "left", "right", and similar expressions used in this specification are merely used for an illustrative purpose, and do not represent the only embodiment.

Unless otherwise defined, meanings of all technical and scientific terms used in this specification are the same as those usually understood by a person skilled in the art to which the present invention belongs. In the present invention, terms used in the specification of the present invention are merely intended to describe objectives of the specific embodiments, but are not intended to limit the present invention. The term "and/or" used in this specification includes any and all combinations of one or more related listed items.

Actually, related known embodiments already exist in the prior art to solve the problem of shift misoperation as described above, specifically, for example, a first known embodiment, "Gear Error Prevention Device in Automatic In-line Shift Control Mechanism", provided in the publication No. CN209196093U, and a second known embodiment, "Automatic In-line Shift Mechanism for Preventing Misoperation", provided in the publication No. CN203962974U. The technical solutions of the above two known embodiments and technical problems existing therein are briefly described with reference to the accompanying drawings.

Figure 1A:
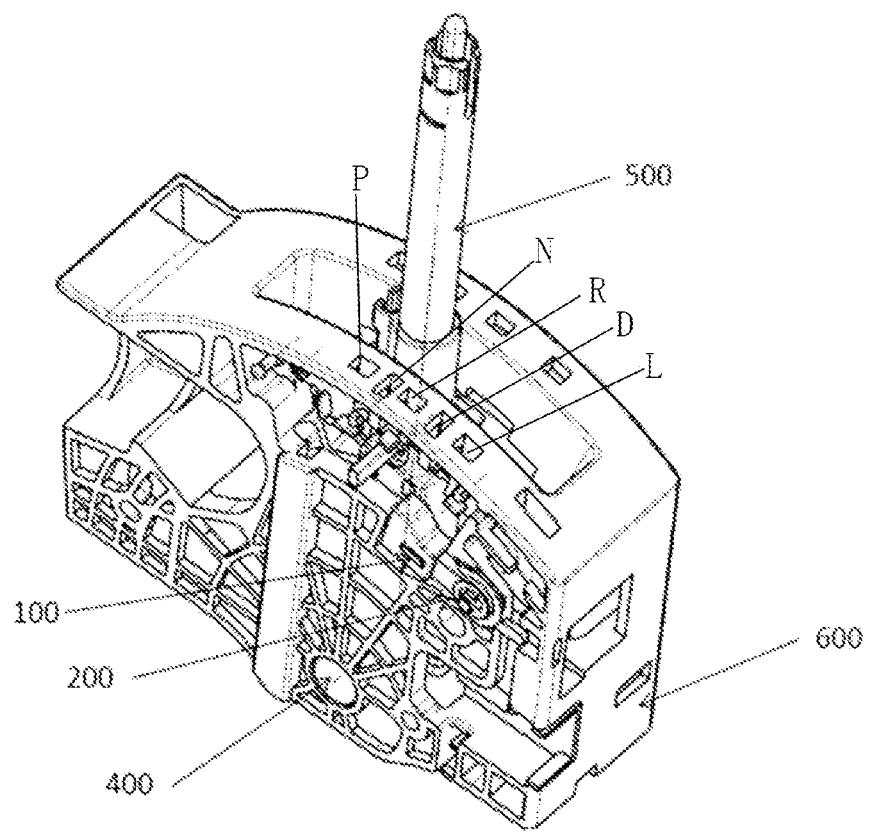
FIG. 1A to FIG. 1D are schematic structural diagrams according to a first known embodiment in the prior art.
Figure 1B:
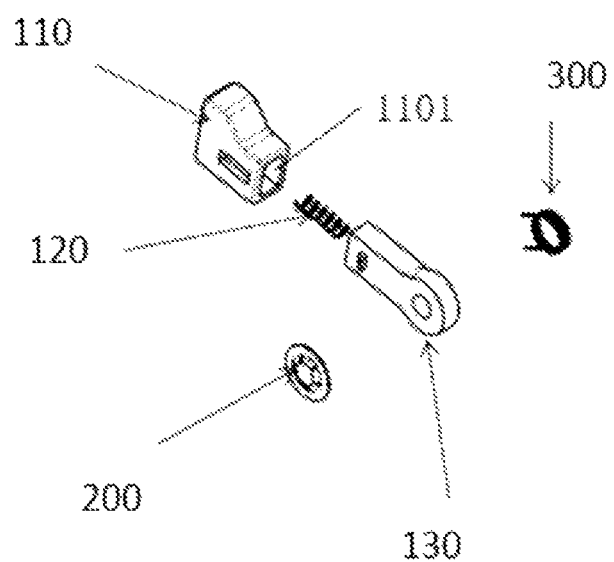
Figure 1C:
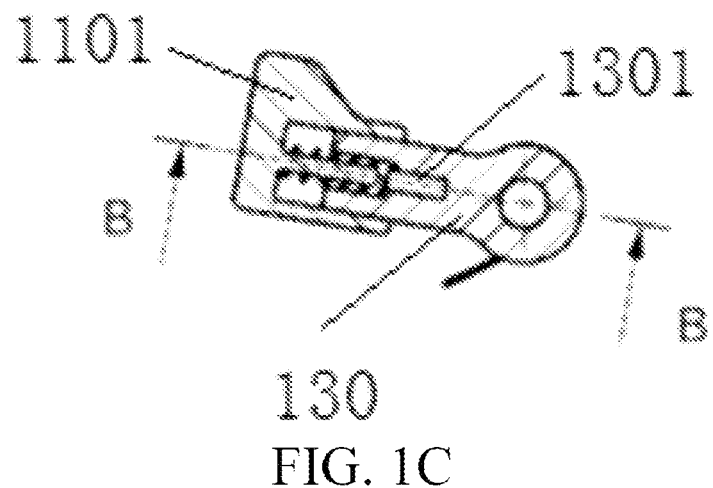
Figure 1D:
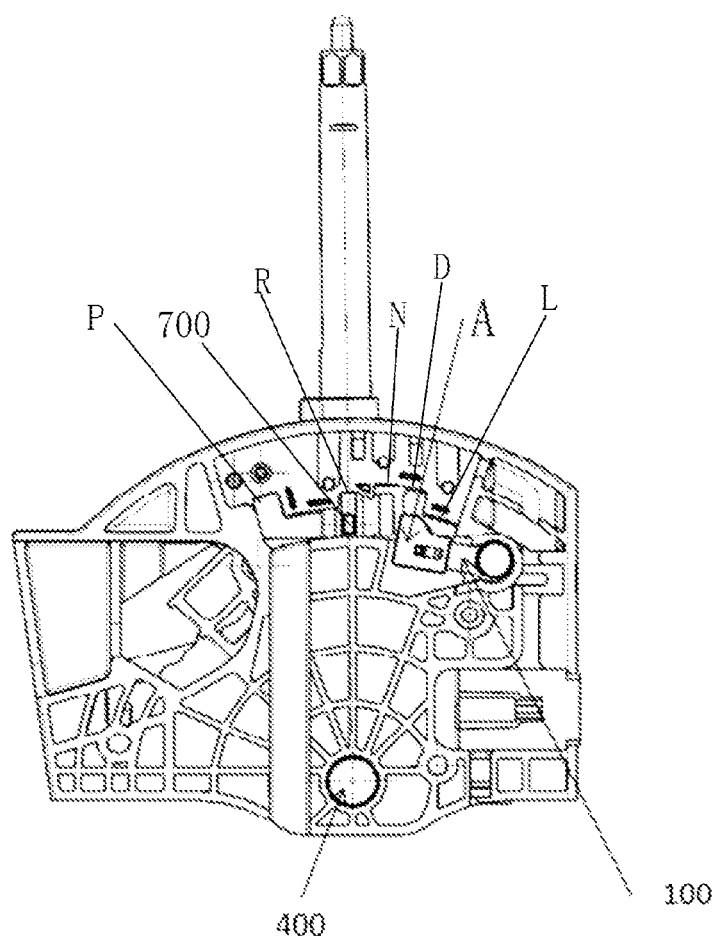

FIG. 1A is a schematic three-dimensional structural diagram of a gear error prevention device of the first known embodiment. FIG. 1B is a schematic three-dimensional exploded structural diagram of the error prevention device in FIG. 1A. FIG. 1C is a cross-sectional view of the error prevention device shown in FIG. 1B. FIG. 1D is a front view of the gear error prevention device according to a first known embodiment during shifting.

For ease of understanding, the applicant has made corresponding supplementary reference numerals in FIG. 1A and FIG. 1D.

As shown in FIG. 1A and FIG. 1B, in the first known embodiment, the gear error prevention device includes an error prevention device 100, a snap sheet 200, a return torsion spring 300, a rotary shaft 400, a joystick assembly 500, and a shifter housing 600. The error prevention device 100 is rotatably arranged on a cylindrical pin in the shifter housing 600, and the return torsion spring 300 is sleeved on the cylindrical pin and applies an upward elastic force to the error prevention device 100. The joystick assembly 500 is rotatably arranged on the rotary shaft 400, and rotates around the rotary shaft 400 when being pushed forward or pulled backward by a driver by hand.

As shown in FIG. 1B and FIG. 1C, the error prevention device 100 includes a slider 110, a spring 120, and a swingable block 130. The swingable block 130 is provided with a spring groove 1301 with a left open end, and the slider 110 is provided with a swingable-block groove 1101 with a right open end. A left end of the swing block 130 is inserted into the swingable-block groove 1101 through the right open end of the slider 110, and can move inward or outward in the swingable-block groove 1101. A right end of the spring 120 enters the spring groove 1301 through the left open end of the swingable block 130, and two ends of the swingable block respectively abut against bottom walls of the spring groove 1301 and the swingable-block groove 1101, and apply outward (rightward) elastic forces to the slider 110. The slider 110 is block-shaped as a whole, and has a flat left end surface and an uneven upper end surface. The left end surface of the slider 110 is a stop surface, and the upper end surface includes a convex surface and a recessed surface.

As shown in FIG. 1D, gear slots of gears such as P, R, N, D, and L are sequentially arranged from front to back in the shifter housing 600. The upper surface of the shifter housing 600 is provided with corresponding gear identifiers (letter symbols such as P, R, N, D, and L as shown in FIG. 1A).

Under normal circumstances, the return torsion spring 300 applies the upward elastic force to the entire error prevention device 100. In addition, the slider 110 can stretch or retract relative to the swingable block 130. When the slider 110 is in an extended limit position (in a situation as shown in FIG. 1D), the stop surface of the slider 110 extends to the front of the D gear slot, and the convex surface substantially corresponds to the D gear slot. When the slider 110 is in a compression limit position (as shown in FIG. 1C, in this case, the left end surface of the swingable block 130 abuts against the bottom wall of the swingable-block groove 1101), the stop surface of the slider 110 corresponds to a right edge position of the D gear slot.

When a gear is required to be shifted from the current P gear, R gear, or N gear to the D gear, the driver first presses a handball button at the top of the joystick assembly 500 by hand, and the shift limit pin 700 moves downward to be separated from the current gear slot (for example, the P gear slot). Then, the joystick assembly 500 is pulled backward (that is, in a direction of the D gear), and the shift limit pin 700 also moves towards the D gear slot. The joystick assembly is further pulled backward when the shift limit pin 700 contacts the stop surface of the slider 110. The shift limit pin 700 pushes the slider 110 to move to the right, and the compression spring 120 accumulates energy. When the slider 110 moves to the compression limit position, the shift limit pin 700 is limited, and the joystick assembly 500 can no longer be pulled backward. Then, the handball button is released, and the shift limit pin 700 is lifted and moves upward into the D gear slot. In this case, the D gear is engaged. The slider 110 loses the abutting effect of the shift limit pin 700, and the spring 120 compressed to accumulate energy releases to eject the slider 110 and return to the extended limit position.

Accordingly, when it is required to shift the gear from the current D gear to the L gear or the P gear, the R gear, or the N gear, the handball button is pressed, the shift limit pin 700 moves downward to abut against the convex surface of the slider 110, and the entire error prevention device 100 rotates counterclockwise around the cylindrical pin. Then, the joystick assembly 500 is pulled backward or pushed forward, and the handball button is released after the shift limit pin 700 reaches the corresponding gear slot, so as to realize the shift.

It can be seen from the above description, in the first known embodiment, the return torsion spring 300 is responsible for a resetting function provided by the entire error prevention device 100. Since the slider 110 of the error prevention device 100 blocks a path of the shift limit pin 700 from the P gear slot, the R gear slot, or the N gear slot to the L gear slot directly, the slider 110 is required to cocked up when the shift limit pin 700 does not apply a downward force to the upper surface of the slider. Therefore, the return torsion spring 300 always applies an elastic reset force to the entire error prevention device 100. In this way, the probability of stress fatigue of the return torsion spring 300 causing reset failure is greatly increased.

In addition, during shifting from the D gear to the L gear or the P gear, the R gear, or the N gear, the error prevention device 100 is required to rotate to drive the return torsion spring 300 to twist. After the shift limit pin 700 is separated from the slider 110, the return torsion spring 300 rotates again to reset the entire error prevention device 100. In this way, in the process of repeated shifting, the return torsion spring 300 will also be twisted and restored repeatedly, which further aggravates the stress fatigue of the return torsion spring 300.

Figure 2A:
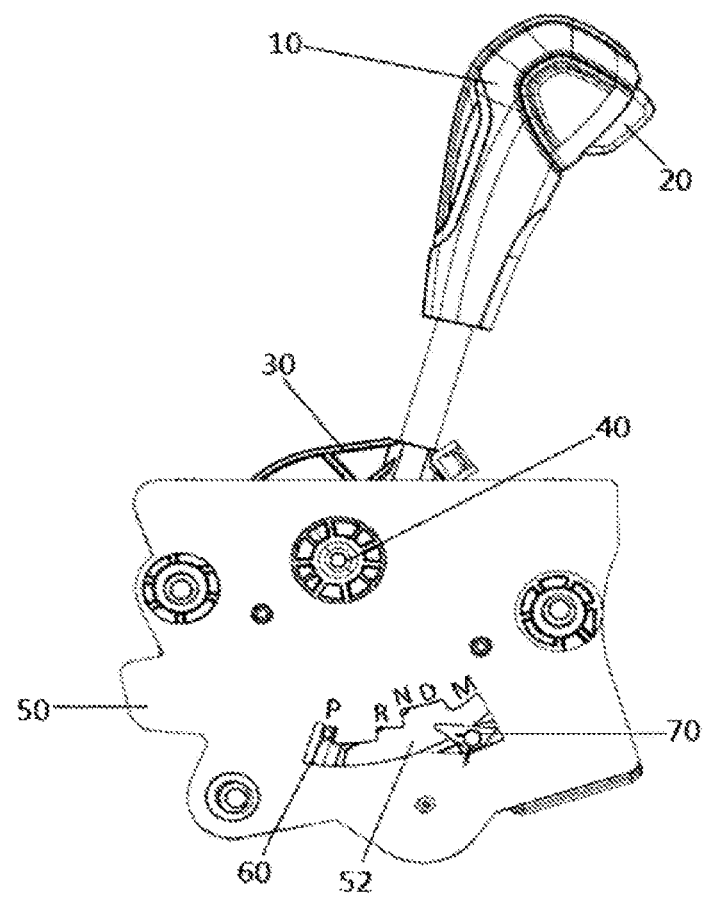
FIG. 2A to FIG. 2B are schematic structural diagrams according to a first known embodiment in the prior art.
Figure 2B:
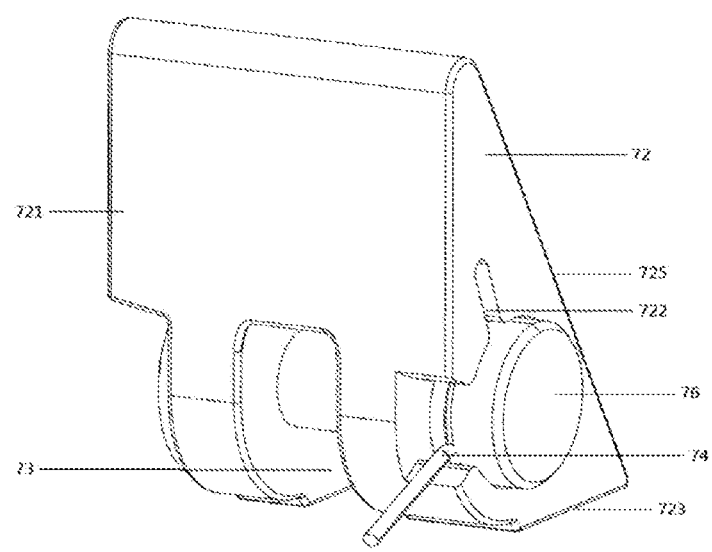

FIG. 2A is a schematic three-dimensional structural diagram of an in-line automatic shift mechanism according to a second known embodiment, and FIG. 2B is a schematic three-dimensional structural diagram of an M-gear mechanism in FIG. 2A. As shown in FIG. 2A, the in-line automatic shift mechanism includes a shift ball head 10, a shift lever 30, a rotary shift shaft 40, a shift support 50, a gear locking pin 60, and an M-gear mechanism 70. A shift button 20 is arranged on the shift ball head 10, and the shift support 50 is provided with a gear slot 52. The gear slot 52 includes a P gear slot, an R gear slot, an N gear slot, a D gear slot, and an M gear slot arranged in sequence from front to back. The gear locking pin 60 is arranged in the gear slot 52 and can perform shifting among the P, R, N, D and M gear slots, and the M-gear mechanism 70 is rotatably arranged in the gear slot 52 and corresponds to the D and M gear slots.

As shown in FIG. 2B, the M-gear mechanism 70 includes a block body 72, a return spring 74, a rotary shaft 76, and a snap spring 78. The block body 72 has a triangular configuration, has a long straight surface 721 for blocking the lever of the shift lever, has a short straight surface 723 being a lower stop surface of the block body rotating clockwise, and has an inclined surface 725 configured to realize smooth shifting from the D gear to the M gear and reduce a shift force generated from shifting out of the M gear. The return spring 74 is arranged between the block body 72 and the gear slot 52, and the return spring 74 applies a counterclockwise twisting force to the block body 72.

As described above, when the gear is required to be shifted from the current P gear, R gear, or N gear to the D gear, the driver first presses the shift button 20 by hand, and the gear locking pin 60 moves downward to be separated from the current gear slot (for example, the P gear slot). Then, the shift lever 30 is pulled backward (that is, in a direction of the D gear), and the gear locking pin 60 also moves towards the D gear slot. When the gear locking pin 60 contacts the long straight surface 721 of the block body 72, the joystick assembly is further pulled backward to overcome the counterclockwise twisting force applied to the block body 72 by the return spring 74. The block body 72 rotates clockwise, and the return spring 74 twists to accumulate energy at the same time. When the short straight surface 723 of the block body 72 is in contact with the bottom surface of the gear slot 52, the block body 72 is limited. Then, the shift button 20 is released, the gear locking pin 60 moves upward and is separated from the long straight surface 721 of the block body 72, and the block body 72 rotates counterclockwise through the return spring 74 to return to an initial position.

Accordingly, if the gear is to be shifted from the current D gear to the M gear or the P gear, the R gear, or the N gear, the shift button 20 is pressed again, and the gear locking pin 60 moves downward and abuts against the inclined surface 725 of the block body 72 to push the block body 72 to rotate counterclockwise. Then, the shift lever 30 is pulled backward or pushed forward, and the shift button 20 is released after the gear locking pin 60 reaches the corresponding gear slot, so as to realize the shift.

It can be seen from the above description that in the second known embodiment, the return spring 74 also has the same problem of stress fatigue as the return torsion spring 300 in the first known embodiment.

In addition, it should be noted that, in the second known embodiment, the block body 72, which is a structure for preventing the gear locking pin 60 from being mistakenly shifted to the M gear during the shifting from the P gear, the R gear, or the N gear to the D gear, only has a degree of freedom of circumferential rotation, but cannot move in a transverse direction. The defect of the structural design is that the block body 72 provides a relatively short stroke for the gear locking pin 60 near the D gear slot. Therefore, a phenomenon of shifting to a wrong gear (for example, shifting to an N gear instead of a desired D gear) easily occurs. Details are as follows.

Those skilled in the art should learn that the D gear is one of the most commonly used gears. Based on the mature gear arrangement or design sequence at present, the gear nearest the D gear in front is the N gear. It is assumed that once a distance between the N gear slot and the D gear slot is relatively small, and the stroke of the structure that prevents the gear locking pin 60 from being mistakenly shifted to the M gear is relatively short in the transverse direction, when the shift lever 30 is pulled back to realize the shift operation from the P gear or the R gear to the D gear, it is likely that the driver releases the shift button 20 before the block body 72 is rotated in place, resulting in the finally mistaken shifting to the N gear.

That is to say, although the second known embodiment solves the problem of preventing the gear locking pin 60 from being mistakenly shifted to the M gear during the shifting from the P gear, the R gear, or the N gear to the D gear, the problem of mistakenly shifting to the N gear during the shifting from the P gear or the R gear to the D gear is easily caused.

Further, it may also be learned from the above description that in the first known embodiment, the error prevention device 100, which is a structure for preventing the shift limit pin 700 from being mistakenly shifted to the L gear during the shifting from the P gear, the R gear, or the N gear to the D gear, not only has a certain degree of freedom for circumferential rotation, but also has a certain degree of freedom for axial stretching and retracting. In this way, the error prevention device 100 provides a sufficient stroke for the shift limit pin 700 near the D gear slot, which can avoid the problem of mistakenly shifting to the N gear in the second embodiment.

However, it should be noted that the circumferential rotation of the error prevention device 100 is the overall rotation of the error prevention device 100. In this way, the circumferential rotation of the error prevention device 100 is within a relatively large sweep range. Therefore, the probability that interferences between the error prevention device 100 and other structures arranged in the shifter housing 600 occur increases. To avoid the above interference, it is necessary to carefully design the position of each structure in the shifter housing 600, which increases the volume, complexity, and design difficulty of the structure.

In view of the defects of the two known embodiments, the embodiment of the present invention provides a blocking component 1000 and a shift mechanism 2000 using or configured with the blocking component 1000. The blocking component 1000 may also prevent the shift limit pin 202 from being mistakenly shifted to the L gear or the M gear during the shifting from the P gear, the R gear, or the N gear to the D gear, may allow the shift limit pin 202 to be shifted directly from the D gear to the L gear or the M gear, or may allow the shift limit pin 202 to be shifted directly from the L gear or the M gear to the P gear, the R gear, or the N gear.

In addition, the blocking component 1000 of the embodiment of the present invention may also solve problems including a reset failure due to stress fatigue of the torsion spring in the above two known embodiments, a structure interference due to a large sweep range of circumferential rotation of the error prevention device 100 in the first known embodiment, shifting to a wrong gear due to a short stroke (for example, shifting to an N gear instead of a desired D gear) provided for the gear locking pin 60 by the block body 72 near the D gear slot in the second known embodiment, and the like.

As shown in FIG. 12 to FIG. 20, FIG. 12 to FIG. 20 are schematic structural diagrams of a shift mechanism 2000 using or configured with a blocking component 1000 according to an embodiment of the present invention. Similar to the above two known embodiments, the shift mechanism 2000 in the embodiment of the present invention may also include a housing 201, a plurality of gear slots formed on the housing 201, a shift lever assembly rotatably connected to the housing 201, and a shift limit pin 202 linked with the shift lever assembly for shifting among the plurality of gear slots. The above structure can adopt any suitable existing structure, or may refer to the description of the above two known embodiments. The details are not described herein again.

The plurality of gear slots include several first gear slots, one second gear slot, and one third gear slot arranged in sequence from front to back. In a feasible embodiment, the several first gear slots may be respectively a P gear slot, an R gear slot, and an N gear slot, the second gear slot is a D gear slot, and the third gear slot is an L gear slot or an M gear slot. The above gear arrangement sequence can avoid the mistake of shifting to a wrong gear (for example, shifting to the L/M gear instead of the desired D gear) as described above. However, in practice, the arrangement order of gears may not be limited to that in the above embodiment.

As shown in FIG. 3 to FIG. 11, the blocking component 1000 is arranged below the gear slots, and includes a body 101 fixedly arranged on a housing 201, a slidable member 102 connected to the body 101 and movable relative to the body 101, a blocking member 103 rotatably connected to the slidable member 102, and an elastic member 104 arranged between the body 101 and the slidable member 102 and configured to apply a reset force to the slidable member 102. The reset force applied to the slidable member 102 by the elastic member 104 causes the slidable member 102 of the blocking component to tend to move towards the outside of the body 101. The blocking member 103 has a stop surface 1031 facing away from the body 101, a transition surface 1032 facing the body 101, and an abutting surface 1033 facing a bottom surface of the slidable member 102. When the blocking member 103 is in a natural state, the abutting surface 1033 is in contact with a surface of the slidable member 102. The natural state includes at least a state in which no external force away from the body 101 is applied to the transition surface 1032.

The body 101 is block-shaped, and has an upper end and a lower end respectively provided with a connecting lug 1011 to realize the fixed connection to the housing 201. The body 101 is fixed, and movable parts of the entire blocking component 1000 include the slidable member 102 and the blocking member 103. The slidable member 102 moves on the body 101, and the blocking member 103 rotates on the slidable member 102. That is to say, the blocking component 1000 of this embodiment has the degree of freedom of transverse movement and rotation. However, since the body 101 for limiting the movement of the slidable member 102 is fixed, and the rotatable blocking member 103 is only one structure of the blocking component 1000, compared with the movement sweeping area of the error prevention device 100 in the first known embodiment, the movement sweeping area of the entire blocking component 1000 is greatly reduced, and the probability that interferences between the blocking component 1000 and other structures in the housing 201 occur is relatively small, which is beneficial to the structural simplification and design of the shift mechanism 2000.

In order to realize the relative movement between the slidable member 102 and the body 101, as shown in FIG. 7 to FIG. 11, in a feasible embodiment, the body 101 is provided with an accommodating cavity 1012 having an open end, and the slidable member 102 is partially accommodated in the accommodating cavity 1012 through the opening and can move in the accommodating cavity 1012. Specifically, the slidable member 102 has an inner end and an outer end. The inner end enters the accommodating cavity 1012 through the opening, and the outer end is located outside the accommodating cavity 1012. The elastic member 104 is biased between an inner wall of the accommodating cavity 1012 and the slidable member 102, and always applies an outward elastic force to the slidable member 102.

In this embodiment, the elastic member 104 may be specifically a helical spring. In order to straighten the elastic member 104 and prevent the elastic member 104 from flexing during compression and release, an end of the slidable member 102 located in the accommodating cavity 1012 is recessed inward to form a groove 1022, a first positioning protrusion 1021 is formed on a bottom wall of the groove 1022, and a second positioning protrusion 1013 corresponding to the first positioning protrusion 1021 is formed on a bottom wall of the accommodating cavity 1012. The elastic member 104 extends through the groove 1022, and has two ends respectively sleeved outside the first positioning protrusion 1021 and the second positioning protrusion 1013.

In this way, when the slidable member 102 moves inward or outward to compress or release the spring, the inner wall of the groove 1022 can play a role in straightening and preventing the elastic member 104 from deflecting, so as to ensure that the elastic member 104 can only stretch or retract in the axial direction and does not bend in a radial direction. The first positioning protrusion 1021 and the second positioning protrusion 1013 can limit the two ends of the elastic member 104 to prevent the position of the elastic member 104 from shifting.

As with the slider 110 in the first known embodiment, the movement of the slidable member 102 relative to the body 101 in this embodiment also has two limiting position states, that is, a compressed state in which the slidable member moves towards an inner side of the body 101 to a dead point position, and a reset state in which the slidable member moves towards an outer side of the body 101 to a dead point position. The dead point position in the compressed state may be defined by the inner end of the slidable member 102 and the bottom wall of the accommodating cavity 1012. When an end surface of the inner end of the slidable member 102 is in contact with and abuts against the bottom wall of the accommodating cavity 1012, the slidable member 102 reaches the compressed state.

Figure 3:
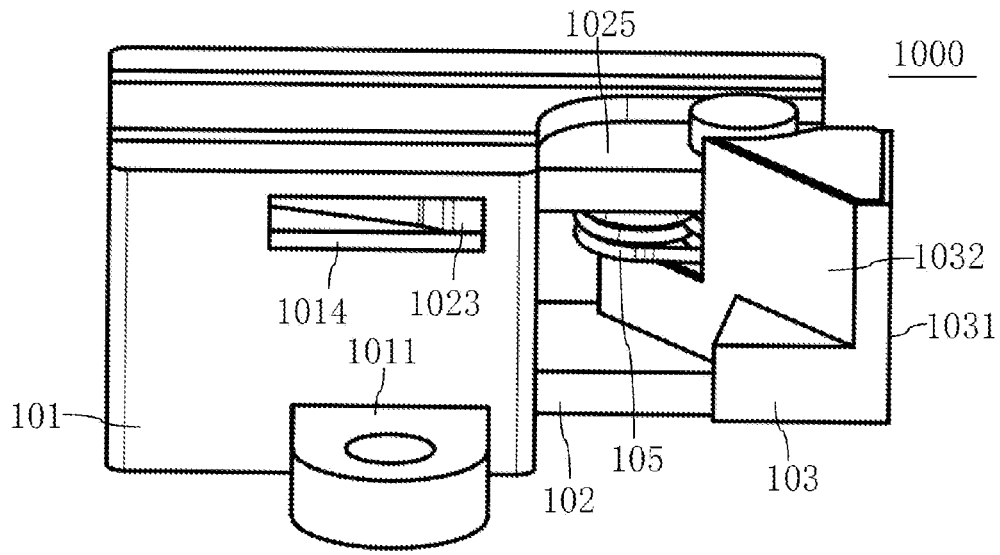
FIG. 3 to FIG. 6 are schematic three-dimensional structural diagrams of a blocking component according to an embodiment of the present invention.

The dead point position in the reset state may be defined by the corresponding limiting structure. Specifically, as shown in FIG. 3, a limiting groove 1014 extending in a same direction as a moving direction of the slidable member 102 is arranged on a side wall of the body 101, and a limiting member 1023 is arranged on an outer wall of the slidable member 102. The limiting member 1023 movably extends through the limiting groove 1014. When the slidable member 102 moves outward until the limiting member 1023 is in contact with and abuts against an inner wall of the limiting groove 1014, the slidable member 102 reaches the reset state.

As described above, the slidable member 102 is partially accommodated in the accommodating cavity 1012, and the outer end of the slidable member extends to the outside of the accommodating cavity 1012. In addition, the blocking member 103 is arranged at the outer end of the slidable member 102. If the outer end of the slidable member 102 lacks support, the blocking member 103 arranged at the outer end will apply a downward torque to the slidable member 102, thereby resulting in an increase of friction between the inner end of the slidable member 102 and the inner wall of the accommodating cavity 1012 and consequently unsmooth movement of the slidable member 102.

In view of this, an outer side wall of the body 101 at the open end of the accommodating cavity 1012 extends outward to form a sliding rail 1015, and the end of the slidable member 102 extends outward to form an extension 1024. The slidable member 102 is supported by the sliding rail 1015 and is slidable on the sliding rail 1015. In this way, the sliding rail 1015 supports the entire slidable member 102, so that each position of the slidable member 102 is supported, and the smoothness of movement is ensured.

Figure 4:
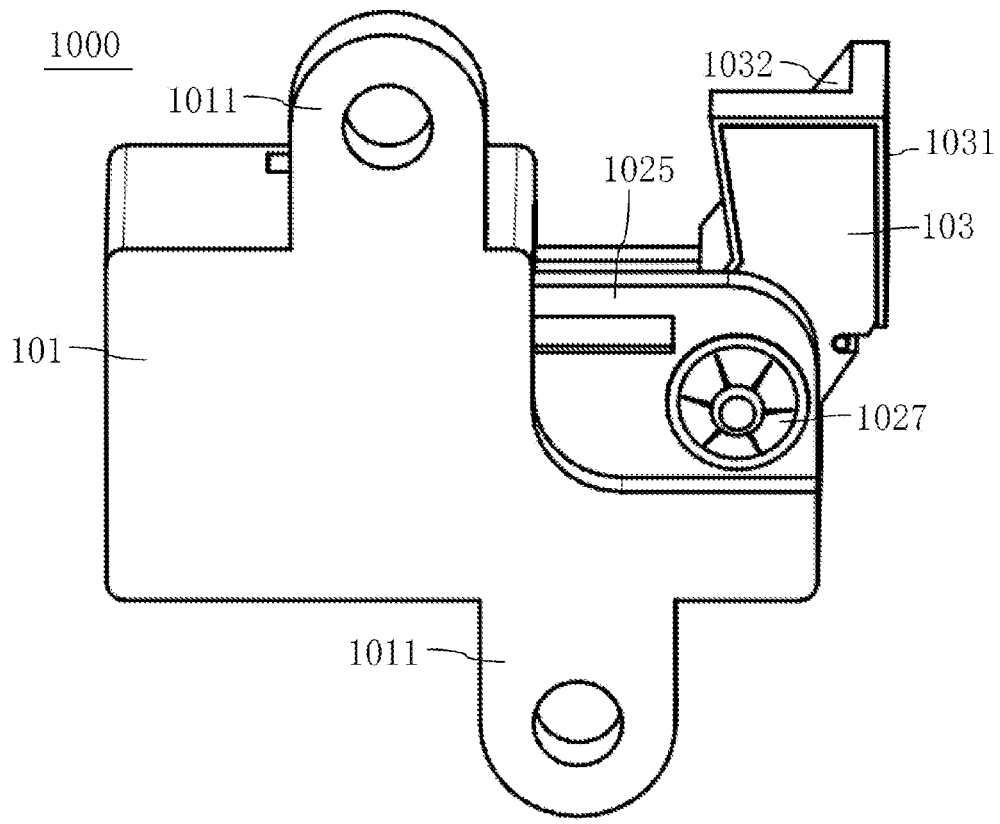
Figure 5:
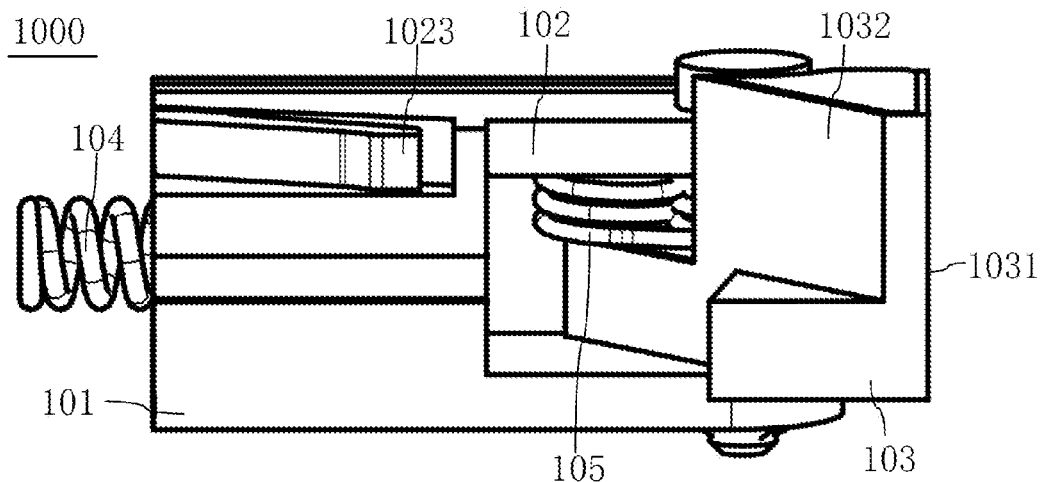
Figure 6:
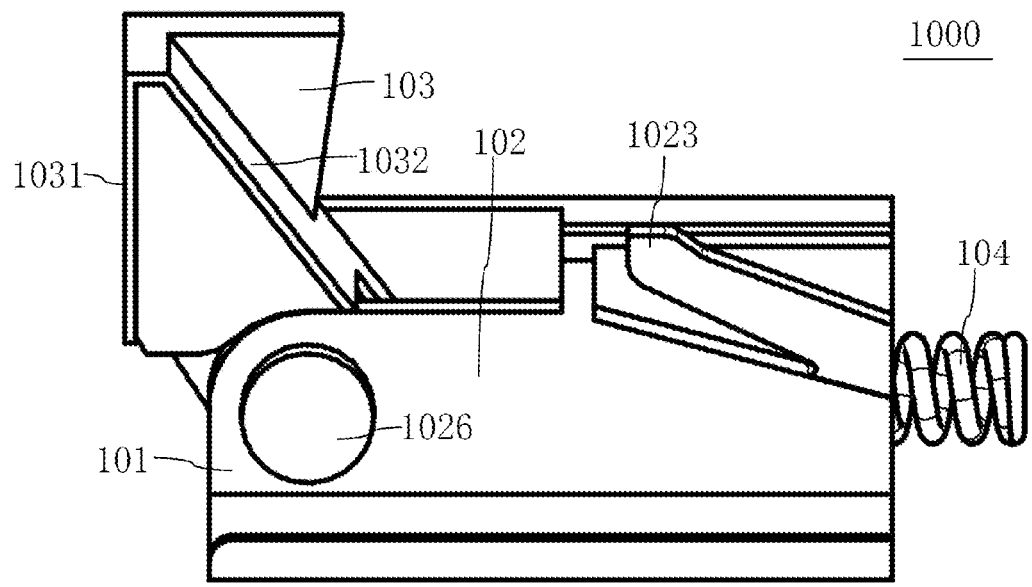
Figure 7:
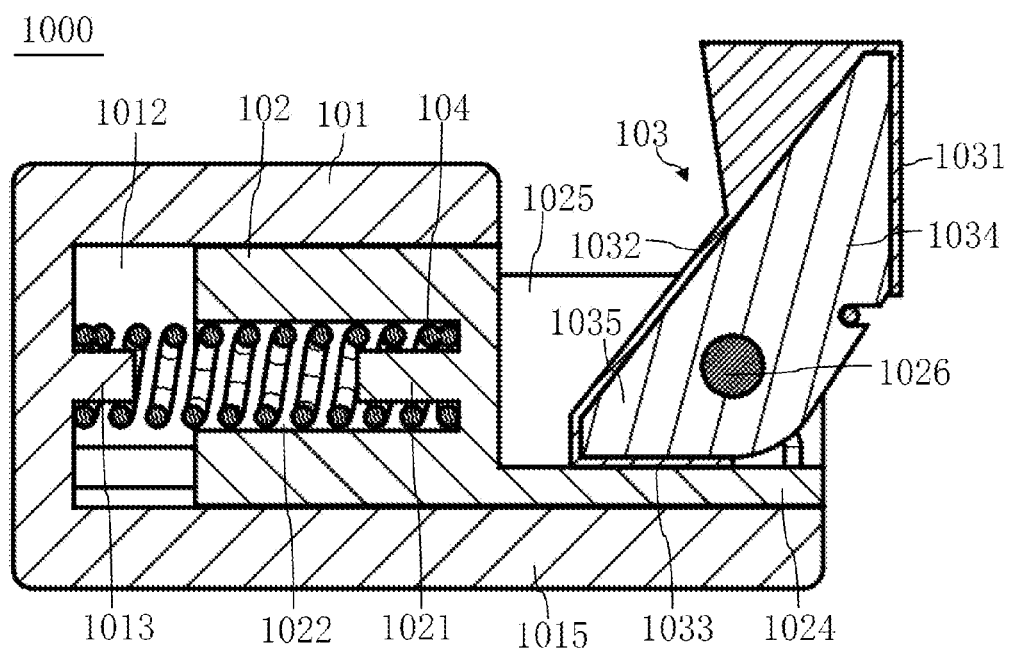
FIG. 7 to FIG. 11 are schematic diagrams of cross-sectional structures of a blocking component according to an embodiment of the present invention.
Figure 8:
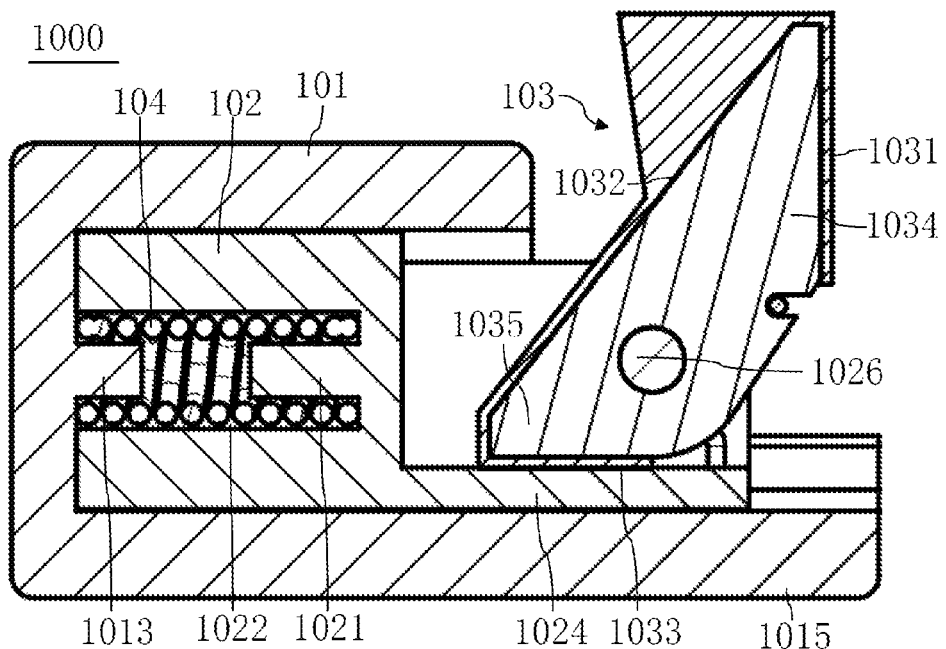
Figure 9:
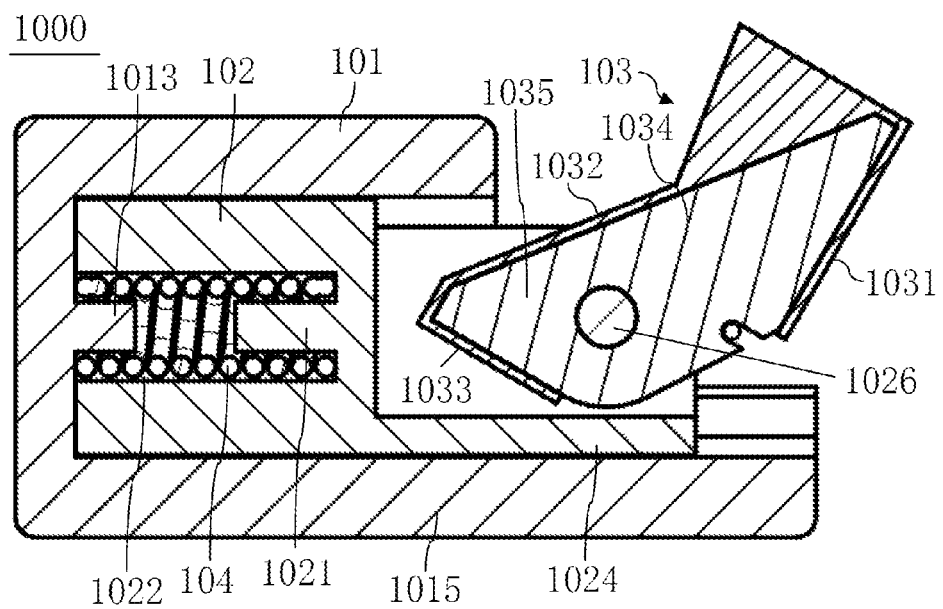
Figure 10:
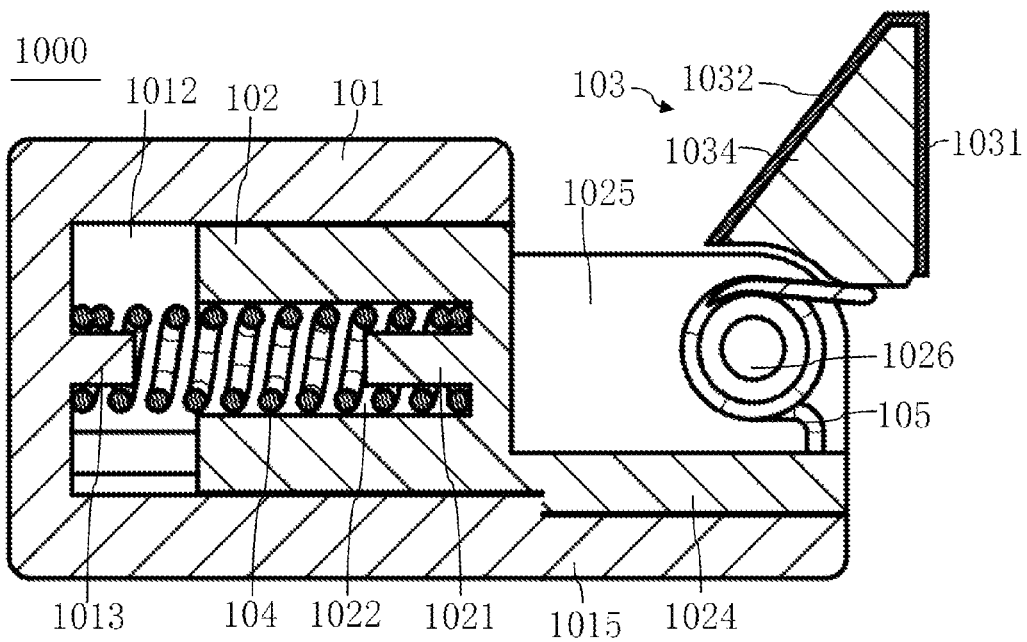
Figure 11:
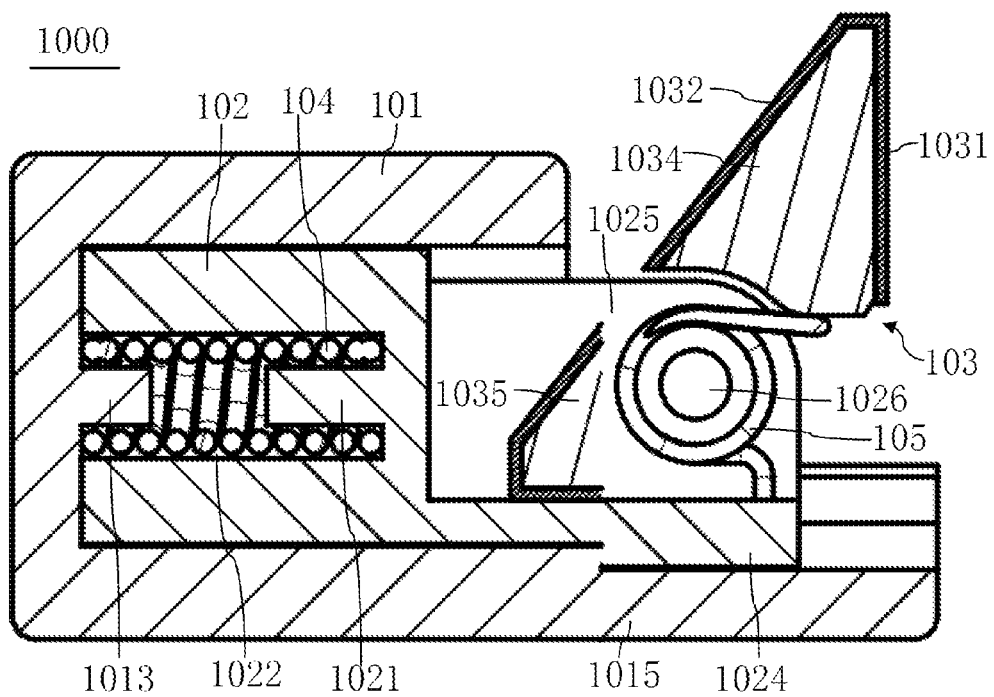
Figure 12:
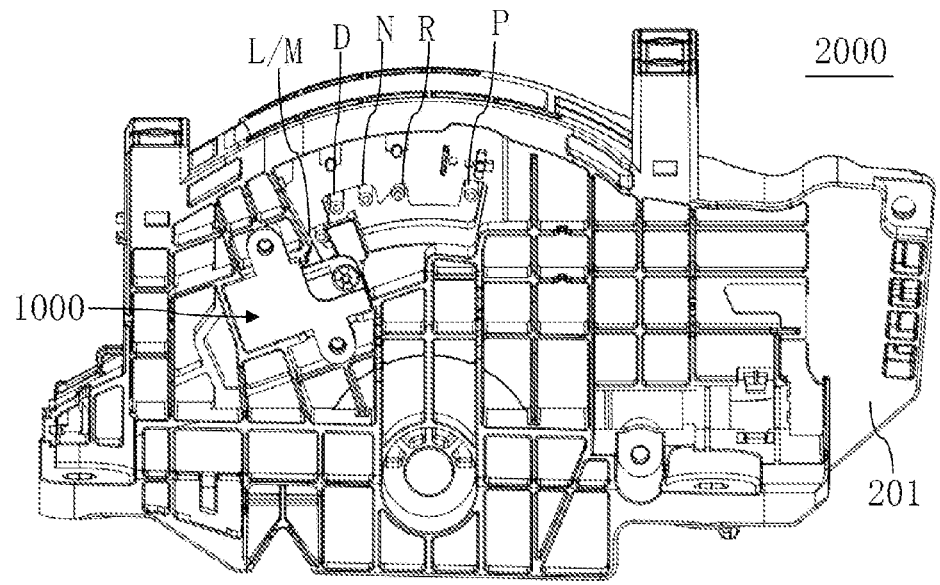
FIG. 12 to FIG. 13 are schematic three-dimensional structural diagrams of a shift mechanism using a blocking component according to an embodiment of the present invention.
Figure 13:
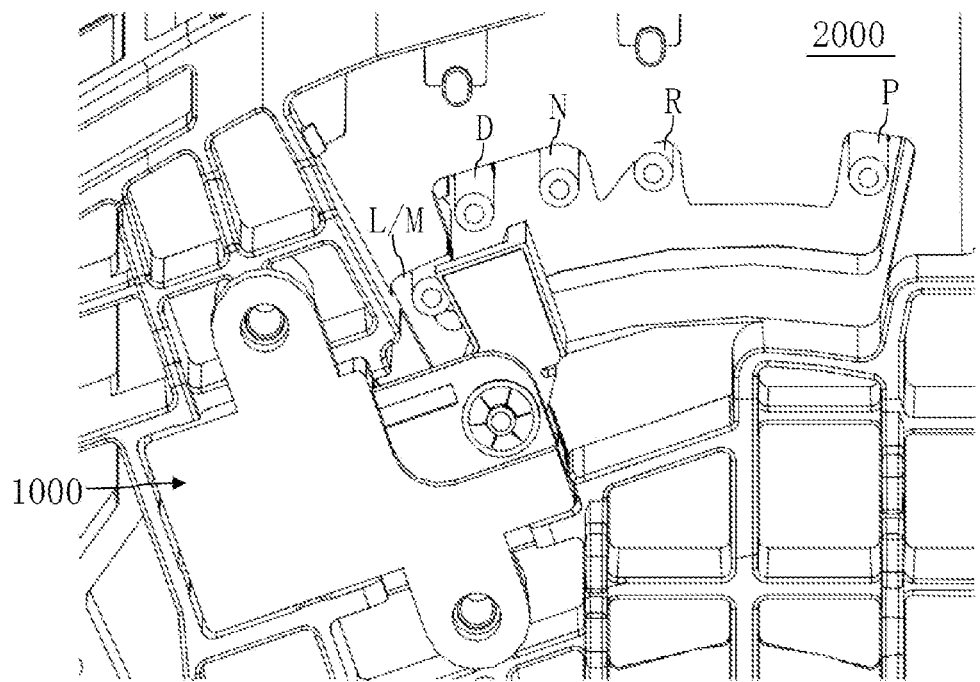

As shown in FIG. 3 to FIG. 5, a connecting portion 1025 is arranged on the extension 1024, and the connecting portion 1025 is substantially in the shape of a vertical plate. The blocking member 103 is rotatably arranged on the connecting portion 1025, and the abutting surface 1033 faces a surface (specifically, an upper surface) of the extension 1024. Specifically, a rotary shaft 1026 may be arranged on the connecting portion 1025, and a shaft hole is arranged in the blocking member 103. The rotary shaft 1026 extends through the shaft hole, and an outer end of the rotary shaft 1026 is provided with a snap spring 1027 for limiting the blocking member 103.

As shown in FIG. 7 to FIG. 11, when the blocking component 1000 is in a natural state, the stop surface 1031 may be a vertical plane to be in better contact with the shift limit pin 202. The transition surface 1032 may be a vertical plane, an inclined plane, a circular arc surface, or the like, which is not limited in this embodiment. The blocking member 103 is bent and includes a blocking section 1034 and a stop section 1035 connected to the blocking section 1034. The blocking section 1034 and the stop section 1035 may be block-shaped. The blocking section 1034 may be specifically a lower end of the blocking member 103, and the stop section 1035 is an upper end of the blocking member 103, both of which may be integrally constructed.

The stop surface 1031 and the transition surface 1032 are two opposite surfaces of the blocking section 1034, and the abutting surface 1033 is a bottom surface of the stop section 1035. In order to solve the phenomenon of stress fatigue caused by the return torsion spring 300 or the return spring 74 being always stressed in the first and second known embodiments, in this embodiment, a rotational connection point between the blocking member 103 and the slidable member 102 is substantially located at a joint between the blocking section 1034 and the stop section 1035, and a torque between a center of mass of the stop section 1035 and the rotational connection point is greater than a torque between a center of mass of the blocking section 1034 and the rotational connection point.

The expression "substantially" may be understood as close to, close to, or within a target range. Specifically, in this embodiment, the "substantially" may means that "the rotational connection point between the blocking member 103 and the slidable member 102 is near or within a predetermined range of the joint between the blocking section 1034 and the stop section 1035".

Therefore, due to the difference of torques between the stop section 1035 and the blocking section 1034 relative to the rotational connection point, the blocking member 103 may be naturally in the natural state or always tends to switch to the natural state when no external force is applied. In this way, even if a torsion spring 105 is not arranged at the rotational connection point between the blocking member 103 and the slidable member 102, the blocking member 103 may also be in the natural state before the shift limit pin 202 moves in the direction of the D gear slot until the shift limit pin is in contact with the stop surface 1031. Therefore, the stop surface 1031 is in a vertical state, so as to achieve the contact with the shift limit pin 202 in a better way.

It should be noted that the contact between the abutting surface 1033 and the upper surface of the slidable member 102 is not limited to the natural state of the blocking member 103 when the transition surface 1032 is free from the external force. That is to say, the blocking member 103 being in the natural state is a sufficient condition for the contact between the abutting surface 1033 and the upper surface of the slidable member 102, but not a necessary condition. Actually, when the stop surface 1031 is subjected to the external force (in a specific scenario, the shift limit pin 202 pushes and is in contact with the stop surface 1031 and pushes the slidable member 102 to move into the body 101), the abutting surface 1033 is also contact with the upper surface of the slidable member 102.

A difference between the torques of the stop section 1035 and the blocking section 1034 relative to the rotational connection point may be made by designing and improving the mass distribution of the stop section 1035 and the blocking section 1034 and/or the distance between the center of mass and the rotational connection point. Specifically, it is only necessary to let F1×L1>F2×L2. F1 and F2 are respectively the mass of the stop section 1035 and the blocking section 1034, and L1 and L2 are respectively the distance between the center of mass and the rotational connection point of the stop section 1035 and the distance between the center of mass and the rotational connection point of the blocking section 1034.

Based on this, by increasing the mass of the stop section 1035 and/or the distance between the center of mass of the stop section 1035 and the rotational connection point, and correspondingly decreasing the mass of the blocking section 1034 and/or the distance between the center of mass of the blocking section 1034 and the rotational connection point, the difference between the torques of the stop section 1035 and the blocking section 1034 relative to the rotational connection point can be made.

In this embodiment, the stop surface 1031 and the transition surface 1032 are located on the motion path of the shift limit pin 202. In this way, when the shift limit pin 202 moves to the D gear slot and is in contact with the stop surface 1031, the blocking member 103 may be pushed to move into the main body 101 by the contact limiting effect of the abutting surface 1033 and the upper surface of the slidable member 102. However, when the shift limit pin 202 is shifted from the D gear slot or the L/M gear slot and in contact with the transition surface 1032, the outward rotation of the blocking member 103 is not limited, so that the blocking member 103 can rotate.

Specifically, when the shift limit pin 202 moves from any of the first gear slots (for example, the P gear slot) to the second gear slot (the M gear slot) until the shift limit pin is in contact with the stop surface 1031 and pushes the slidable member 102 to move to the compressed state, the shift limit pin 202 corresponds to the second gear slot and is staggered with the third gear slot (the L/M gear slot). In this case, the shift limit pin 202 just reaches below the second gear slot and is staggered with the third gear slot. In this way, by operating the shift lever assembly to lift the shift limit pin 202, the shift limit pin can enter the second gear slot instead of the third gear slot. However, when the shift limit pin 202 enters the second gear slot, the slidable member 102 is switched to the reset state through the elastic member 104.

Correspondingly, when the shift limit pin 202 moves from the second gear slot or the third gear slot towards any of the first gear slots until the shift limit pin is in contact with and abuts against the transition surface 1032, the blocking member 103 rotates. When the shift limit pin 202 is separated from the transition surface 1032, the blocking member 103 returns to the natural state.

With reference to FIG. 14 to FIG. 20, shift processes of a shift mechanism 2000 configured with a blocking component 1000 according to an embodiment of the present invention are described.

Figure 14:
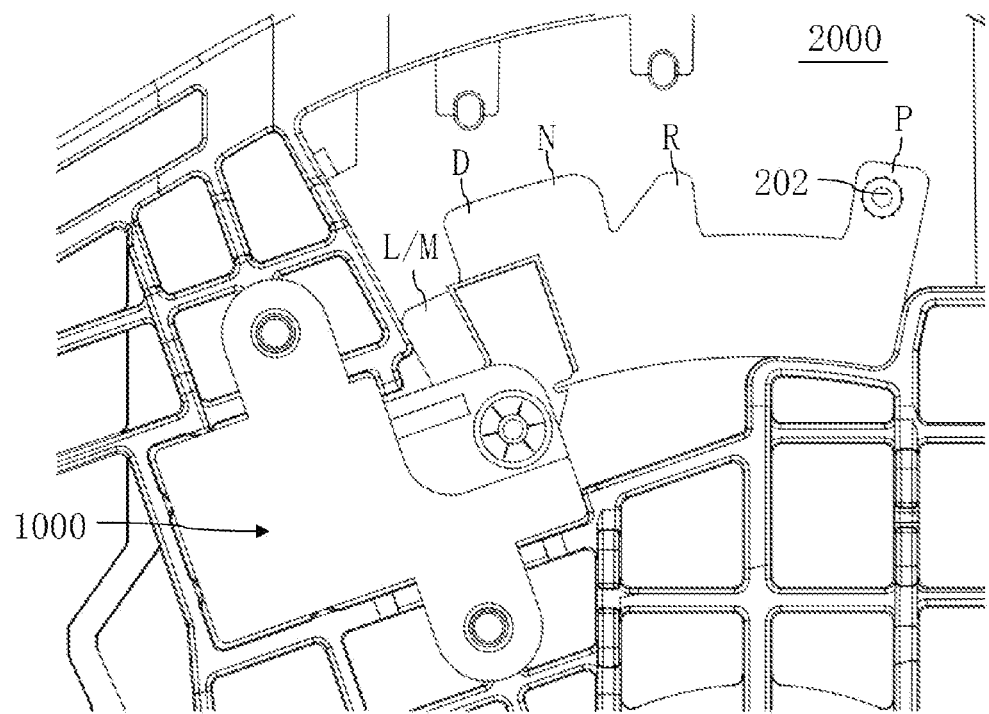
FIG. 14 to FIG. 20 are schematic diagrams of shift processes of a shift mechanism using a blocking component according to an embodiment of the present invention.

As shown in FIG. 14, the shift limit pin 202 is located in the P gear slot at this time.

Figure 15:
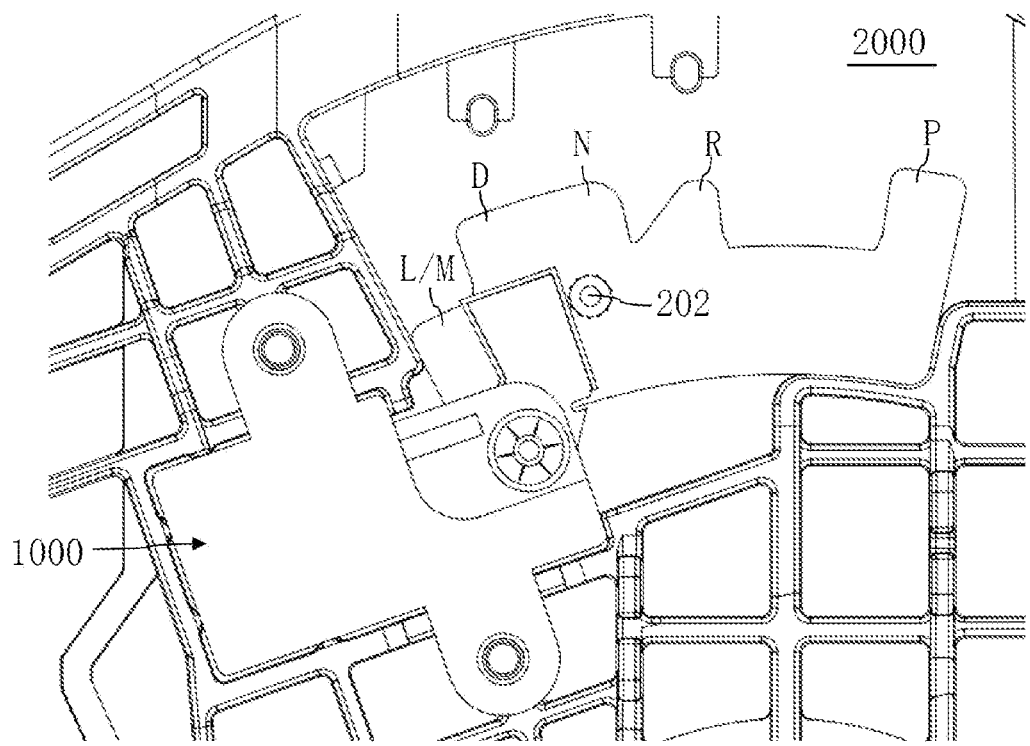

As shown in FIG. 15, a button on the shift lever assembly is pressed to cause the shift limit pin 202 to move downward and to be disengaged from the P gear slot. Then, the shift lever assembly is pulled backward (leftward as shown in FIG. 15). The shift limit pin 202 is driven to move backward to be in contact with the stop surface 1031 of the blocking member 103.

Figure 16:
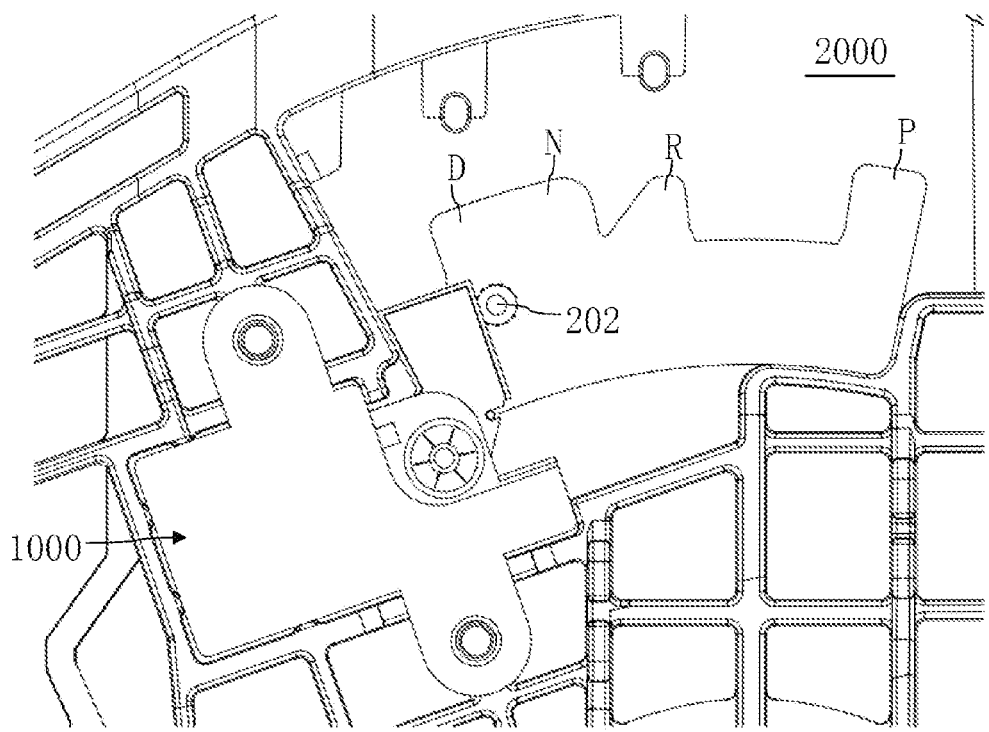

As shown in FIG. 16, the shift lever assembly is further pulled backward, and the shift limit pin 202 pushes the blocking member 103 to move towards the inside of the body 101, and stops moving until the blocking member 103 moves to the compressed state. In this case, the shift limit pin 202 just reaches below the D gear slot.

Figure 17:
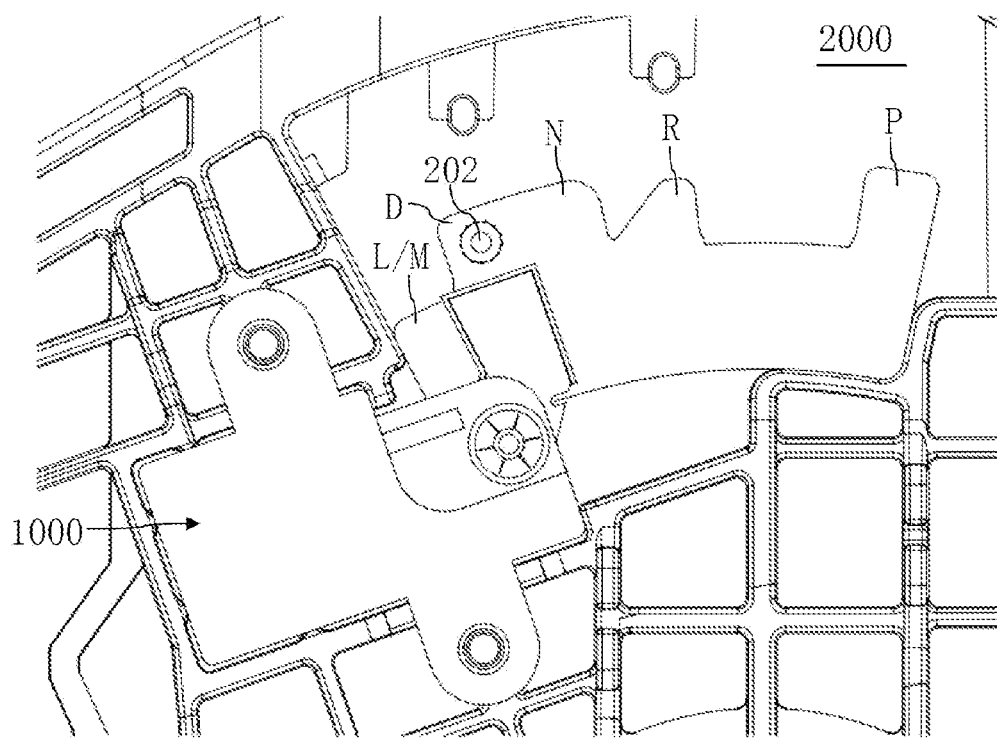

As shown in FIG. 17, the button on the shift lever assembly is released, and the shift limit pin 202 moves upward into the D gear slot, so as to complete the shift operation of the D gear. The blocking member 103 starts to reset forward through the elastic member 104.

Figure 18:
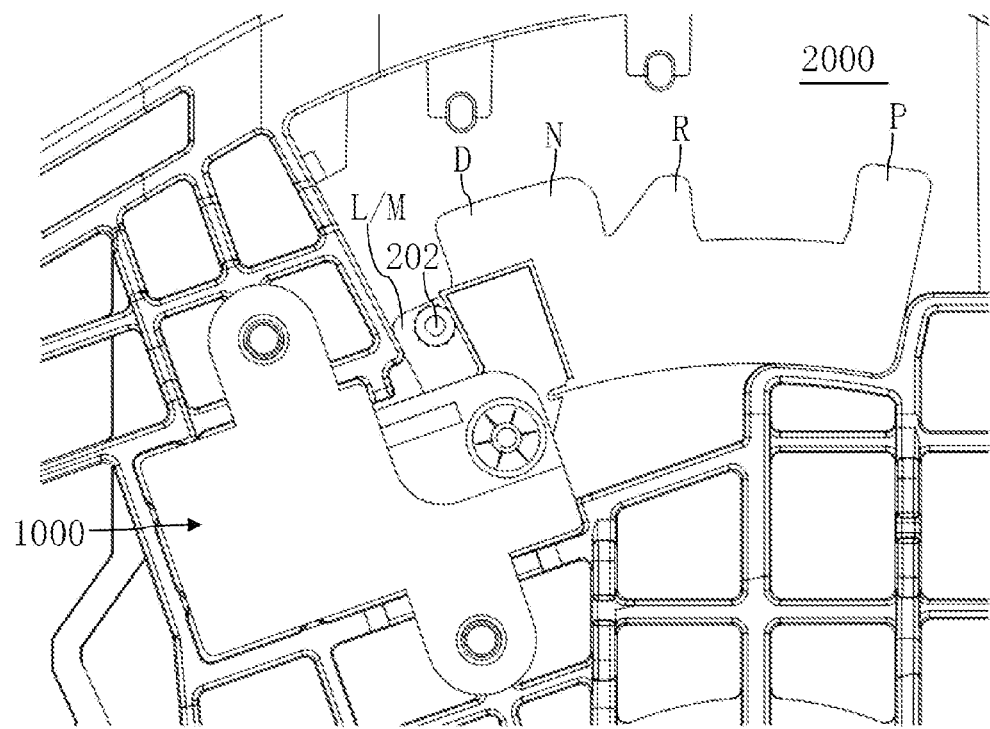

As shown in FIG. 18, the button on the shift lever assembly is pressed, and the shift lever assembly is further pulled backward, so that the shift limit pin 202 can be shifted to the L/M gear slot.

Figure 19:
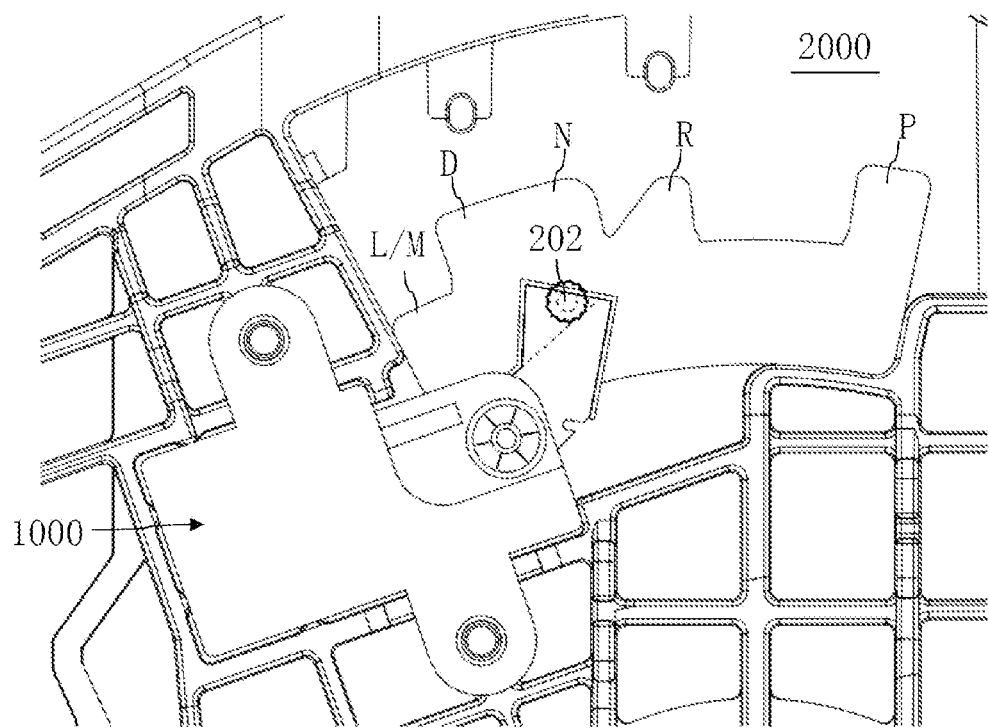

As shown in FIG. 19, the button on the shift lever assembly is pressed, and the shift lever assembly is pushed forward (rightward as shown in FIG. 19). The shift limit pin 202 slides over the transition surface 1032 of the blocking member 103 and drives the blocking member 103 to rotate.

Figure 20:
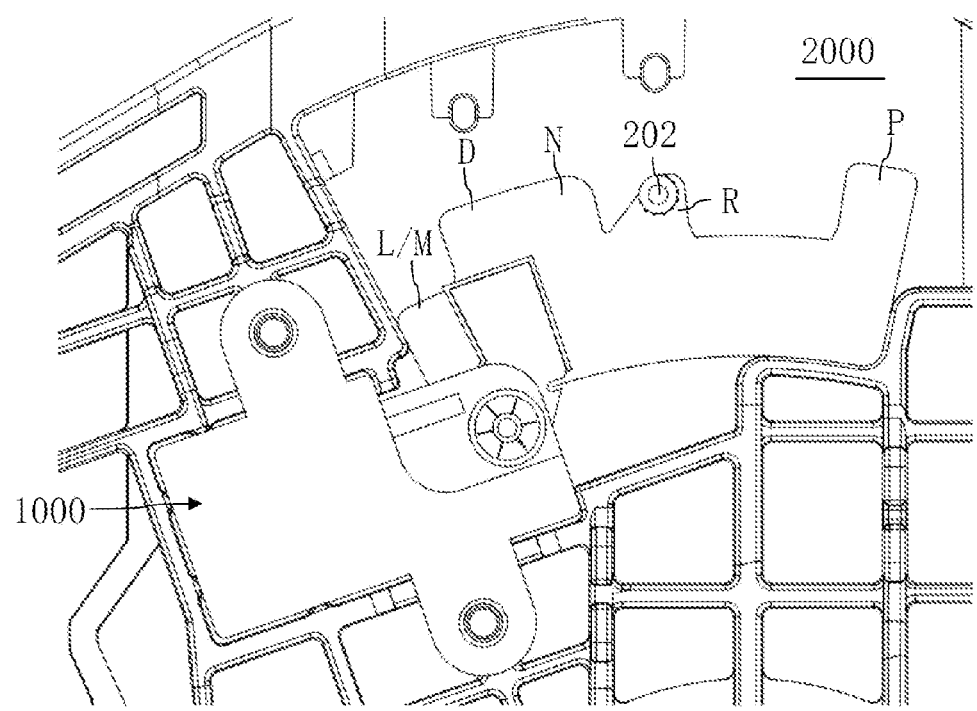

As shown in FIG. 20, the shift limit pin 202 is separated from the transition surface 1032 of the blocking member 103, and the blocking member 103 returns to the natural state. The shift lever assembly is further pulled forward, so that the shift limit pin 202 reaches the R gear slot. The button on the shift lever assembly is released, and the shift limit pin 202 moves upward into the R gear slot, so as to complete the shift operation of the R gear.

It can be seen from the above that the blocking component 1000 of the embodiment of the present invention not only has a degree of freedom of transverse linear movement, but also has a degree of freedom of circumferential rotation. Therefore, compared with the second known embodiment, the blocking component 1000 of the embodiment of the present invention provides a relatively long stroke for the shift limit pin 202 near the D gear slot, thereby avoiding the problem of shifting to a wrong gear (for example, shifting to an N gear instead of a desired D gear).

Since the blocking component 1000 of the embodiment of the present invention is configured on the shift mechanism 2000 and finally installed on a vehicle, the vehicle inevitably bumps due to road conditions during travelling. Therefore, in some embodiments, the natural state may further include a state of the blocking member 103 when the vehicle configured with the shift mechanism 2000 is stationary, runs smoothly, or bumps slightly. When the vehicle is stationary or running smoothly, the force applied to the blocking member 103 is in a balanced state, and the blocking member 103 can be stably in the natural state by means of the difference between the torques of the stop section 1035 and the blocking section 1034 relative to the rotational connection point. However, when the vehicle bumps slightly, the blocking member 103 may slightly shake correspondingly, and the difference between the torques of the stop section 1035 and the blocking section 1034 relative to the rotational connection point can overcome the slight shaking of the blocking member 103.

The vehicle running smoothly or bumping slightly may be conventionally understood, which is not limited in this embodiment. Specifically, shaking or swaying of the vehicle with a small amplitude and a low frequency during travelling may be regarded as smooth travelling or slight bumping. The small amplitude may be ±10 cm, and the low frequency may be 5 Hz.

However, when the vehicle bumps violently during travelling, it may be difficult to completely overcome or offset the unbalanced force of the blocking member 103 only by the difference between the torques of the stop section 1035 and the blocking section 1034 relative to the rotational connection point, thereby causing the blocking member 103 to rotate back and forth and hit the slidable member 102, resulting in parts wear and abnormal noise. In view of this, in some embodiments of the present invention, a torsion spring 105 may be arranged at the rotational connection point. Specifically, the torsion spring 105 may be sleeved outside the rotary shaft 1026 of the slidable member 102, and has two support legs fixedly connected to the slidable member 102 and the blocking member 103 respectively.

It should be particularly emphasized that, although in some embodiments of the present invention, the torsion spring 105 may also be arranged between the slidable member 102 and the blocking member 103. However, the torsion springs in the first and second known embodiments are stressed differently in any state, the embodiment of the present invention has a structural design that the blocking member 103 may be in or tend to be in a natural state even without the torsion spring 105 by virtue of the difference between the torques of the stop section 1035 and the blocking section 1034 relative to the rotational connection point, so that the torsion that the torsion spring 105 may apply to the blocking member 103 when the blocking component 1000 is in the natural state is zero or slightly greater than zero. Alternatively, when the blocking component 1000 is in the natural state, the torsion applied to the blocking member 103 by the torsion spring 105 approaches zero.

Since the natural state of the blocking member 103 is a longest state, the torsion of the torsion spring 105 is set to be zero or slightly greater than zero, or approach zero when the blocking member 103 is in the natural state, so that the torsion spring 105 is unstressed or slightly stressed most of the time. In this way, the stress fatigue of the torsion spring 105 is greatly relieved, and the service life of the torsion spring 105 is extended.

In addition, in terms of the torsion spring in the first known embodiment applying the reset force to the entire error prevention device 100, the torsion spring 105 in the embodiment of the present invention only needs to reset the blocking member 103. Compared with the error prevention device 100, the blocking member 103 has relatively small mass and requires a relatively small reset force. Therefore, the torsion spring 105 in this embodiment can complete the resetting of the blocking member 103 only by slightly twisting to accumulate energy, and the torsion degree and resetting strength are both small, which can further alleviate the problem of stress fatigue of the torsion spring 105.

Although the torsion of the torsion spring 105 is zero or slightly greater than zero or approaches zero when the blocking member 103 is in the natural state, once an external force facing away from the body 101 is applied to the transition surface 1032, for example, during movement forward, the shift limit pin 202 applies an acting force to the transition surface 1032 when sliding over the transition surface, the blocking member 103 rotates and drives the torsion spring 105 to twist to accumulate energy at the same time. Then the torsion spring 105 may apply a reset force to the blocking member 103 in an opposite direction to the external force until the external force disappears, that is, the shift limit pin 202 is separated from the transition surface 1032, and the torsion spring 105 resets the blocking member 103.

Alternatively, the vehicle violently bumps during travelling, causing the blocking member 103 to shake and causing the blocking member 103 to tend to shake and rotate or rotate, and then the torsion applied to the blocking member 103 by the torsion spring 105 causes the blocking member to be stable without shaking.

In this embodiment, the torque that the torsion spring 105 preferably applies to the blocking member 103 when the blocking component 1000 is in the natural state is slightly greater than 0. In this way, the torsion spring 105 applies a slight pre-tightening force to the blocking member 103, so as to better avoid the shaking of the blocking member 103 caused by violently bumping during travelling of the vehicle.

The above "slightly greater than 0" or "close to 0" may mean that the torsion applied to the blocking member 103 by the torsion spring 105 is used to overcome the shaking of the blocking member 103 caused by the external force. That is to say, torque that the torsion spring 105 applies to the blocking member 103 when the blocking component 1000 is in the natural state is required to be not less than the force of the shaking of the blocking member 103 caused by bumping during travelling of the vehicle. In a more specific embodiment, the "slightly greater than 0" or "approaching 0" may be (0.1-2%) times an elastic limit of the torsion spring 105. In this way, even if the vehicle bumps violently, the pre-tightening force applied by the torsion spring 105 can overcome the shaking force of the blocking member 103, and then the blocking member 103 can be prevented from rotating back and forth and hitting the slidable member 102.

Since the torsion of the torsion spring 105 in the embodiment of the present invention when the blocking member 103 is in the natural state only needs to overcome the shaking force of the blocking member 103, compared with the torsion springs in the first and second known embodiments which are always in a twisted and stressed state, the torsion spring 105 in the embodiment of the present invention is slightly stressed most of the time, which greatly relieves the phenomenon of the stress fatigue of the torsion spring 105.

It should be noted that in the description of the present invention, the terms "first" and "second" are only used to describe the purpose and distinguish between similar objects. There is no sequence between the two terms, and the terms cannot be understood as indicating or implying relative importance. In addition, in the description of the present invention, unless otherwise stated, "a plurality of" means two or more.

Any numerical value quoted herein includes all values of a lower value and an upper value that progressively increase by one unit from the lower value to the upper value, as long as an interval of at least two units exists between any lower value and any higher value. For example, if it is stated that a number of components or the value of a process variable (for example, temperature, pressure, time, and so on) is from 1 to 90, preferably from 21 to 80, and more preferably from 30 to 70, the purpose is to explain that the values such as 15 to 85, 22 to 68, 43 to 51, and 30 to 32 are also explicitly listed in the specification. For values less than 1, a unit is properly considered as 0.0001, 0.001, 0.01, or 0.1. These are only examples intended to be explicitly expressed, and it may be considered that all possible combinations of numerical values listed between the lowest value and the highest value are explicitly stated in the specification in a similar way.

Unless otherwise stated, all ranges include endpoints and all numbers between endpoints. "About" or "approximately" used with the range is suitable for two endpoints of the range. Thus, "about 20 to 30" is intended to cover "about 20 to about 30", including at least indicated endpoints.

The above are only a few embodiments of the present invention. A person skilled in the art can make various modifications and variations to the embodiments of the present invention without departing from the spirit and scope of the present invention according to the contents disclosed in the application documents.

What is claimed is:

1. A shift mechanism, comprising:
a housing;
gear slots, formed on the housing and comprising several first gear slots, one second gear slot, and one third gear slot arranged in sequence;
a shift lever assembly, rotatably connected to the housing;
a shift limit pin, linked with the shift lever assembly for shifting among the plurality of gear slots; and
a blocking component including:
a body;
a slidable member, slidably connected to the body and movable relative to the body, the slidable member having an inner end and an outer end, the inner end extending into an interior of the body and the outer end located outside the body;
an elastic member, arranged between the body and the slidable member and configured to apply an elastic reset force to the slidable member so that the slidable member tends to move towards the outside of the body; and
a blocking member, rotatably connected to the slidable member, the blocking member disposed at the outer end of the slidable member, and having a stop surface facing away from the body, a transition surface facing the body, and an abutting surface facing the slidable member, wherein when the blocking member is in a state in which no external force away from the body is applied to the transition surface, the abutting surface is in contact with a surface of the slidable member;
wherein the body is fixedly arranged on the housing, the stop surface and the transition surface are located on a motion path of the shift limit pin, and the slidable member has a compressed state in which the slidable member moves towards an inner side of the body to a dead point position, and a reset state in which the slidable member moves towards an outer side of the body to a dead point position, wherein
when the shift limit pin moves from any of the first gear slots towards the second gear slot until the shift limit pin is in contact with the stop surface and pushes the slidable member to move to the compressed state, the shift limit pin corresponds to the second gear slot and is staggered with the third gear slot; and
when the shift limit pin enters the second gear slot, the slidable member is switched to the reset state through the elastic member.

2. The shift mechanism according to claim 1, wherein the blocking member is bent and comprises a blocking section and a stop section connected to the blocking section, the stop surface and the transition surface are two opposite surfaces of the stop section, and the abutting surface is a relatively vertically lower surface of the stop section; and
a rotational connection point between the blocking member and the slidable member is substantially located at a joint between the blocking section and the stop section, and a torque between a center of mass of the stop section and the rotational connection point is greater than a torque between a center of mass of the blocking section and the rotational connection point.

3. The shift mechanism according to claim 2, further comprising a torsion spring arranged at the rotational connection point, and when the blocking component is in the state in which no external force away from the body is applied to the transition surface, a torsion applied to the blocking member by the torsion spring is 0 or greater than 0.

4. The shift mechanism according to claim 1, wherein the body is provided with an accommodating cavity having an open end, the slidable member is partially accommodated in the accommodating cavity and movable in the accommodating cavity, and the elastic member is biased between an inner wall of the accommodating cavity and the slidable member.

5. The shift mechanism according to claim 4, wherein an outer side wall of the body at the open end of the accommodating cavity extends outwards to form a sliding rail, an end of the slidable member extends outwards from the accommodating cavity to form an extension, the slidable member is configured to slide on the sliding rail, a connecting portion is arranged on the extension, the blocking member is rotatably arranged on the connecting portion, and the abutting surface faces a surface of the extension.

6. The shift mechanism according to claim 5, wherein an end of the slidable member located in the accommodating cavity is recessed inward to form a groove, a first positioning protrusion is formed on a bottom wall of the groove, a second positioning protrusion corresponding to the first positioning protrusion is formed on a bottom wall of the accommodating cavity, and the elastic member extends through the groove and has two ends respectively sleeved outside the first positioning protrusion and the second positioning protrusion.

7. The shift mechanism according to claim 1, wherein a limiting groove extending in a same direction as a moving direction of the slidable member is arranged on a side wall of the body, a limiting member is arranged on an outer wall of the slidable member, and the limiting member movably extends through the limiting groove.

8. The shift mechanism according to claim 1, wherein when the shift limit pin moves from the second gear slot or the third gear slot towards any of the first gear slots until the shift limit pin is in contact with and abuts against the transition surface, the blocking member rotates, and when the shift limit pin is separated from the transition surface, and the blocking member is reset to the state in which no external force away from the body is applied to the transition surface.

9. The shift mechanism according to claim 1, further comprising a torsion spring arranged at a rotational connection point between the blocking member and the slidable member, and the torsion spring is configured to apply a torsion to the blocking member to overcome shaking of the blocking member caused by an external force.

* * * * *